United States Patent
Tillmann et al.

(12)

(10) Patent No.: US 6,356,950 B1
(45) Date of Patent: Mar. 12, 2002

(54) METHOD FOR ENCODING AND DECODING DATA ACCORDING TO A PROTOCOL SPECIFICATION

(75) Inventors: Axel Tillmann, Upton; Vladimir Novikov, Worcester, both of MA (US)

(73) Assignee: Novilit, Inc., Marlborough, MA (US)

( * ) Notice: Subject to any disclaimer, the term of this patent is extended or adjusted under 35 U.S.C. 154(b) by 0 days.

(21) Appl. No.: 09/360,224

(22) Filed: Jul. 23, 1999

Related U.S. Application Data

(63) Continuation-in-part of application No. 09/228,015, filed on Jan. 11, 1999, now abandoned.

(51) Int. Cl.[7] .............................. G06F 15/16; G06F 9/45
(52) U.S. Cl. ........................................ 709/246; 717/5
(58) Field of Search .......................... 709/246; 704/4; 717/5; 710/70

(56) References Cited

U.S. PATENT DOCUMENTS

| | | | | |
|---|---|---|---|---|
| 5,177,679 A | * | 1/1993 | Baxter | 712/36 |
| 5,291,583 A | * | 3/1994 | Bapat | 717/5 |
| 5,481,601 A | * | 1/1996 | Nazif et al. | 379/207 |
| 5,638,066 A | * | 6/1997 | Horiuchi et al. | 341/60 |
| 5,649,227 A | * | 7/1997 | Anezaki et al. | 712/1 |
| 5,680,585 A | * | 10/1997 | Bruell | 703/26 |
| 5,748,187 A | * | 5/1998 | Kim et al. | 345/302 |
| 5,778,360 A | * | 7/1998 | Sugita et al. | 707/4 |
| 5,790,812 A | * | 8/1998 | Frohmuller et al. | 710/105 |
| 5,815,206 A | * | 9/1998 | Malladi et al. | 348/390 |
| 5,870,749 A | * | 2/1999 | Adusumilli | 707/101 |
| 5,933,642 A | * | 8/1999 | Greenbaum et al. | 717/9 |
| 6,009,470 A | * | 12/1999 | Watkins | 709/231 |
| 6,081,212 A | * | 6/2000 | Tagato et al. | 341/79 |
| 6,085,240 A | * | 7/2000 | Suzuki et al. | 709/223 |
| 6,138,154 A | * | 10/2000 | Karino | 709/223 |
| 6,138,272 A | * | 10/2000 | Tonouchi | 717/5 |

OTHER PUBLICATIONS

Tantiprasut, D., et al., ASN.1 Protocol Specification for Use With Arbitrary Encoding Schemes, IEEE/ACM Transactions on Networking, vol. 5, No. 4, pp. 502–513, Aug. 1997.*

Neufeld, G., et al., The Design and Implementation of an ASN.1–C Compiler, IEEE Transactions on Software Engineering, vol. 16, No. 10, pp. 1209–1220, Oct. 1990.*

Newton, H., Newton's Telecom Dictionary, Telecom Books, New York, NY, p. 605, Oct. 1998.*

Srivastava, M., et al., "Using VHDL for High–Level, Mixed–Mode System Simulation," IEEE Design & Test of Computers, IEEE, pp. 31–40, Sep. 1992.*

* cited by examiner

*Primary Examiner*—Zarni Maung
*Assistant Examiner*—Andrew Caldwell
(74) *Attorney, Agent, or Firm*—Hale and Dorr LLP

(57) ABSTRACT

A method for processing a data signal, for instance, a data signal encoding a data bit stream which carries a sequence of data packets. The method includes accepting a protocol specification that includes specification of a number of elements, each specification including a length and a name, and optionally internal structure and actions. The specification of at least some of the elements includes at least one instruction for performing an action associated with the elements. For instance, the elements are sub-packets or data fields. The method also includes accepting a series of data packets and for each accepted packet, associating portions of the input packet with elements specified in the protocol specification. For each of the associated portions of the input packet, the method includes performing actions according to instructions included in the specification of elements associated with that portion of the input packet, for example by use of a subroutine call or passing a data message.

13 Claims, 17 Drawing Sheets

```
100 packet ("information element") {
101   field(:"identifier",8) {alt{
102     0x04:"narrow-band dearer capability"
103     0x08:"cause" 0x14:"call state"
104     0x1e:"progress indicator"
      .  .  .
111     0x5c:"quality of service parameter"
112     0x5e:"broad-band bearer capability"
113     0x5f:"broad-band low layer information"
      .  .  .
128     0x7c:"narrow-band low layer compatibility"
129     0x7d:"narrow-band high layer compatibility"
130     rest:"unknown"}
131   }
132   field(:"ext bit")
133   field(:"coding standard"'2) {alt{
134     0:"ITU-T standardized coding"
135     1:"ISO/IEC standard"
136     2:"national standard"
137     3:"standard defined for the network present on the network instruction field is
138     not significant"}
139   }
140   field(:"flag")
141   field(:"reserved") {"should be 0x00"}
142   field(:action identifier",3)
143   len field("content len",16)
```

FIG. 6A

```
144   alt(var(:"identifier")) {
145       0x04:packet(:"narrow-band bearer capability")    // Q.2931 pg. 79
146                                                        // Q.2931 pg. 64
147       0x08:packet(:"cause")                            // Q.2931 pg. 68
148       0x14:packet(:"call state")                       // Q.2931 pg. 59
149       0x1e:packet(:"progress indicator")               // Q.2931 pg. 81

. . .

156       0x5c:packet(:"quality of service parameter")     // Q.2931 pg. 72
157       0x5e:packet(:"broad-band bearer capability")     // Q.2931 pg. 51
158       0x5f:packet(:"broad-band low layer information") // Q.2931 pg. 54

. . .

173       0x7c:packet(:"narrow-band low layer compatibility")  // Q.2931 pg. 80
174       0x7d:packet(:"narrow-band high layer compatibility") // Q.2931 pg. 79
175       rest:"unknown"
176   }
177 }
```

```
100  packet("broad-band bearer capability") {
101    field(:"ext bit")
102    field(:"spare",2)
103    field("bearer class",5) {alt{
104      1:"BCOB-A" 3:"BCOB-C" 0x10:"BCOB-X" rest:"reserved"}}
105    alt(var(:"ext bit")) {
106      0: field(:"ext bit") field(:"spare",2)
107         field("traffic type",3) {alt{
108           0:"no indication"
109           1:"constant bit rate"
110           2:"varible bit rate"
111           rest:"reserved"}}
112         field("timing requirements",2) {alt{
113           0:"no indication"
114           1:"end-to-end timing required"
115           2:"end-to-end timing not required"
116           rest:"reserved"}}
117    }
118    field(:"ext bit")
119    field("susceptibility to clipping",2) {alt{
120      0:"not susceptible to clipping"
121      1:"susceptible to clipping"
122      rest:"reserved"}}
123    field(:"spare",3)
124    field("user plane connection configuration",2) {alt{
125      0:"point-to-point"
126      1:"point-to-multipoint"
127      rest:"reserved"}}
128  }
```

```
100  void C$Q_2931_Signaling::PP$information_element (char* aname, unsigned a) {
101     if( !CurPduLen() ) return;
102     ProcessPacketBeg( aname, a );
103
104     V$FP$identifier = processField ( "identifier", 8);
105     FP$identifier ( V$FP$identifier );
106     V$FP$ext_bit = ProcessedField ( "ext bit", 1);
107     FP$ext_bit ( V$FP$ext_bit );
108     V$FP$coding_standard = ProcessField ( "coding standard", 2);
109     FP$coding_standard ( V$FP$coding_standard );
110     V$FP$flag = ProcessField ( "flag", 1);
111     FP$flag ( V$FP$flag );
112     V$FP$reserved = ProcessField ( "reserved", 1);
113     FP$reserved ( V$FP$reserved );
114     V$FP$action_identifier = ProcessField ( "action identifier", 3);
115     FP$action_identifier ( V$FP$action_identifier );
116     V$FP$information_element$contens-len = ProcessField ( "contens len", 16);
117     FP$information_element$contens_len ( V$FP$information_element$contens_len );
118     SetPduLen ( V$FP$information_element$contens_len );
119
120     if ( V$FP$identifier == 0x04 ) {
121         PP$narrow_band_bearer_capability ( "narrow-band bearer capability",CurPduLen());
122
123     } else
124     if ( V$FP$identifier == 0x08 ) {
125         PP$cause ( "cause", CurPduLen());
126
127     } else
128     if ( V$FP$identifier == 0x14 ) {
```

*FIG. 9A*

```
129       PP$call_state ( "call state", CurPduLen () );
130     } else
131     if ( V$FP$identifier == 0x1e ) {
132       PP$progress_indicator ( "progress indicator", CurPduLen() );
133
134     ...
135
136
137
138
139     } else
140     if ( V$FP$identifier == 0x5c ) {
141       PP$quality_of_service_parameter ( "quality of service parameter", CurPduLen() );
142
143     } else
144     if ( V$FP$identifier == 0x5e ) {
145       PP$broad_band_bearer_capability ( "broad-band bearer capability", CurPduLen() );
146
147     } else
148     if ( V$PD$identifier == 0x5f ) {
149       PP$broad_band_low_layer_information ( "broad-band low layer information",
150       CurPduLen() );
151
152     ...
153
154
155
156     } else
```

FIG. 9B

```
157    if ( V$FP$identifier == 0x7c ) {
158      PP$narrow_band_low_layer_compatibility ("narrow-band low layer compatibility",
159    CurPduLen());
160
161    } else
162    if ( V$FP$identifier == 0x7d ) {
163      PP$narrow_band_high_layer_compatibility ("narrow-band high layer compatibility",
164    CurPduLen());
165
166    } else {
167      PrintName("unknown");
168    }
170    } // end of packet processor function definition PP$information_element
```

*FIG. 9C*

```
171  void C$Q_2931_Signaling::FP$identifier (unsigned a) {
172
173      PrintName(": ");
174
175      if ( a == 0x04 ) {
176          PrintName("narrow-band bearer capability");
177      } else
178      if ( a == 0x08 ) {
179          PrintName("cause");
180      } else
181      if ( a == 0x14 ) {
182          PrintName("call state");
183      } else
184      if ( a == 0x1e ) {
185          PrintName("progress indicator");
186      .
187      .
188      .
189
190      } else
191      if ( a == 0x5c ) {
192          PrintName("quality of service parameter");
193      } else
194      if ( a == 0x5e ) {
195          PrintName("broad-band bearer capability");
196      } else
197      if ( a == 0x5f ) {
198          PrintName("broad-band low layer information");
```

*FIG. 9D*

```
201     . . .
202     } else
203     if ( a == 0x7c ) {
204         PrintName("narrow-band low layer compatibility");
205     } else
206     if ( a == 0x7d ) {
207         PrintName("narrow-band high layer compatibility");
208     } else {
209         PrintName("unknown");
210     }
211     ;
212 } // end of field processor function definition FP$identifier
```

*FIG. 9E*

```
215  void C$Q_2931_Signaling::PP$broad_band_bearer_capability (char* aname,unsigned a){
216    if( !CurPduLen() ) return;
217    ProcessPacketBeg( aname, a );
218
219    V$FP$ext_bit = ProcessField ( "ext bit", 1);
220    FP$ext_bit ( V$FP$ext_bit );
221    V$FP$spare = ProcessField ( "spare", 2);
222    FP$spare ( V$FP$spare );
223    V$FP$broad_band_bearer_capability$bearer_class = ProcessField ("bearer class",5);
224    FP$broad_band_bearer_capability$bearer_class (
225              V$FP$broad_band_bearer_capability$bearer_class );
226
227    if ( V$FP$ext_bit == 0 ) {
228      V$FP$ext_bit = ProcessField ( "ext bit", 1);
229      FP$ext_bit ( V$FP$ext_bit );
230      V$FP$spare = ProcessField ( "spare", 2);
231      FP$spare ( V$FP$spare );
232      V$FP$broad_band_bearer_capability$traffic_type = ProcessField ("traffic type",3);
233      FP$broad_band_bearer_capability$traffic_type (
234              V$FP$broad_band_bearer_capability$traffic_type );
235      V$FP$broad_band_bearer_capability$timing_requirements = ProcessField ("timing
236 requirements", 2);
237      FP$broad_band_bearer_capability$timing_requirements (
238              V$FP$broad_band_bearer_capability$timing_requirements );
239
240    } else ;
241      V$FP$ext_bit = ProcessField ( "ext bit", 1);
242      FP$ext_bit ( V$FP$ext_bit );
243      V$FP$broad_band_bearer_capability$susceptibility_to_clipping = ProcessField (
244 "susceptibility to clipping", 2);
```

*FIG. 9F*

```
245      FP$broad_band_bearer_capability$susceptibility_to_clipping (
246      V$FP$broad_band_bearer_capability$susceptibility_to_clipping );
247      V$FP$spare = ProcessField ( "spare", 3);
248      FP$spare ( V$FP$spare );
249      V$FP$broad_band_bearer_capability$user_plane_connection_configuration =
250      ProcessField ( "user plane connection configuration", 2);
251      FP$broad_band_bearer_capability$user_plane_connection_configuration
252            (V$FP$broad_band_bearer_capability$user_plane_connection_configuration );
253
254      ProcessPacketEnd(aname, a );
255    }
256    // end of packet processor function defination PP$broad_band_bearer_capability
```

*FIG. 9G*

METHOD FOR ENCODING AND DECODING DATA ACCORDING TO A PROTOCOL SPECIFICATION

CROSS-REFERENCE TO RELATED APPLICATIONS

This application is a continuation-in-part application of U.S. application Ser. No. 09/228,015, filed Jan. 11 1999, now abandoned.

BACKGROUND

This invention relates to processing of digital communication.

Communication processing devices are used in data and telephone communication systems, including wide area data communication networks, telephone networks, satellite communication networks, in-vehicle automobile communication systems, naval communication systems, home appliances, and retail devices. In the context of the description that follows, a communication processing device is almost any device that accepts and processes input flows of information and as a result acts on the input flows or produces output flows of information from those input flows. Communication processing devices may be implemented in software or as special purpose hardware, or using a combination of software and special purpose hardware. Examples of communication devices include data routers, which take input information flows and produce output information flows, and multimedia terminals, which take input information flows and acts on those input flows to present multimedia information to a user.

Operation of communication processing devices is typically specified in a variety of ways. In particular, the communication protocols used on the input and output flows are often specified in communication standards written in English or some other "human" language, possibly augmented using diagrams and picture. The operation of the devices typically focuses on the communication protocols used on the input and output flows. These specifications are then used as the basis of software implementations (e.g., in C, C++, Assembler, FlexLogic description) or as the basis of circuit designs.

SUMMARY

In one aspect, in general, the invention is a method for processing a data signal, for instance, a data signal encoding a data bit stream which carries a sequence of data packets. The method includes accepting a protocol specification that includes specification of a number of elements, each specification including a length and a name, and optionally internal structure and actions. For instance, the elements are sub-packets or data fields. The method also includes accepting a series of data packets and for each accepted packet, associating portions of the input packet with elements specified in the protocol specification. For each of the associated portions of the input packet, the method includes performing actions included in the specification of elements associated with that portion of the input packet, for example by use of a subroutine call or passing a data message.

The invention can include one or more of the following features:

The specification of an action includes a specification of a programming language statement, such as a C++ statement, and wherein performing actions included in the specification of elements includes executing the programming language statement.

The method includes processing the protocol specification to produce executable software, and execution of the software implements the functions of associating portions of input packets with elements specified in the protocol specification and performing actions associated with elements specified in the protocol specification.

The protocol specification includes an object-oriented specification of elements, wherein names of components of an element are local to that element.

The protocol specification includes an association of numerical values and symbolic names for an element.

The method of can include processing the protocol specification to produce a hardware description, and wherein performing actions included in the specification of elements includes sending a message identifying a specified action.

Aspects of the invention include one or more of the following advantages.

By specifying a packet format using a formal, unambiguous language, various hardware and software based implementations can be automatically formed without the risk of introducing human error.

Implementations for different target environments, can be produced by processing the same protocol specification, thereby reducing human effort.

Specifying a protocol using a formal, unambiguous language allows development of completely unambiguous protocol standards, and therefore offers true interoperability between implementations of such developed standards.

The formal language allows development and implementation of complex protocols, in part because the specification is concise and includes built-in error handling capabilities. Furthermore, the language can be used to directly specify hardware protocol processors, for example, including direct solution trees for the specified communication protocol.

A protocol specification written in this formal language can be used to automatically build or configure test systems for devices that communicate using the protocol, and to automatically build or configure communication analyzers which monitor communication according to the protocol.

Multiple different protocols specified according to the formal language can coexist in a single implementation.

Other data series or information streams can also be processed according to a protocol specification. For example, chemical analysis sequences or DNA sequences can be processed according to the invention.

Other features and advantages of the invention are apparent from the following description, and from the claims.

DESCRIPTION OF DRAWINGS

FIGS. 6A–B are a protocol specification for the exemplary packet structure;

FIG. 8 is a protocol specification of the particular type of information element packet;

FIGS. 9A–G contain exemplary source code that is generated from a protocol specification.

DESCRIPTION

Figure 1:
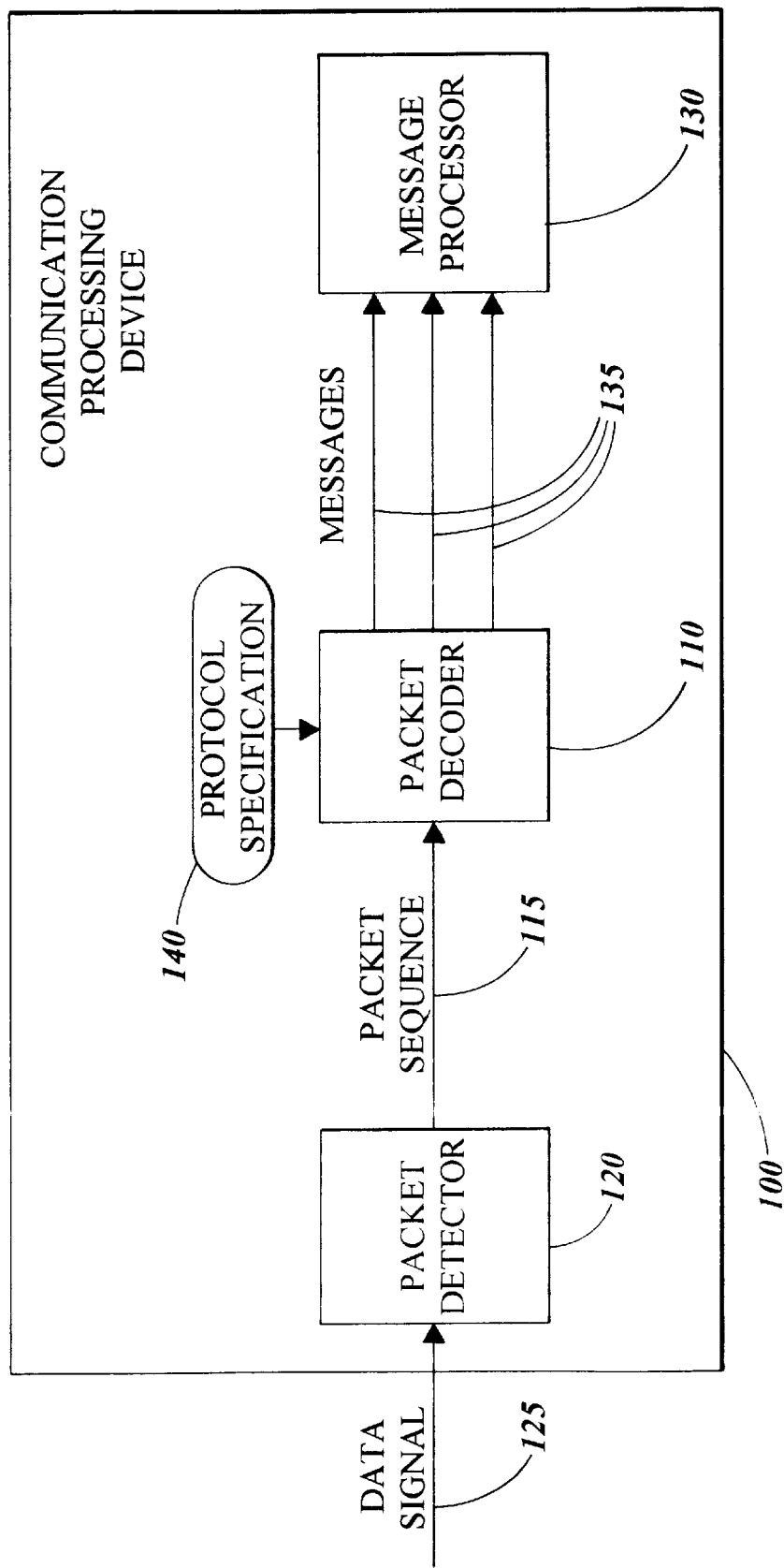
FIG. 1 is a first general view of a communication processing device that makes use of a packet decoder to process a sequence of input packets.

1 System Overview (FIG. 1)

Referring to FIG. 1, in a first general view of a number of alternative embodiments of the invention, a communication processing device 100 accepts and processes a data signal 125. Data signal 125 is first segmented into a packet sequence 115 by a packet detector 120. Each of the packets in packet sequence 115 is processed in turn by packet decoder 110. Packet decoder 110 processes the packets according to a protocol specification 140, which includes definitions of one or more packet types. These definitions include the structure and meaning (syntax and semantics) of the packets, as well as the required actions to take when various elements of the packets are present. For each packet that it processes, packet decoder 110 performs actions that are specified in protocol specification 140. In this embodiment, packet decoder 110 produces zero, one, or more parameterized messages 135, or other types of signals, that it passes to a message processor 130. Message processor 130 makes use of the information in messages 135 to produce a result, such as presenting the information in the input packets to a user. In other embodiments described below, the actions performed by packet decoder 110 as a result of processing packets include executing subroutine calls and other program statements specified in protocol specification 140, or updating internal state values (variables) in the protocol decoder itself.

The general structure shown in FIG. 1 is used in a variety of applications. In one exemplary application, communication processing device 100 accepts digitized multimedia information as data signal 125 according, for instance, to an MPEG standard. The multimedia information may include a multiplexed video, audio, and other data. Packet detector 120 finds individual packets (or "frames") based, for instance, on synchronization data in data signal 125 or on electrical characteristics (e.g., voltage levels) of the data signal between packets. Packet detector 120 sends a finite length bit sequence to packet decoder 110 for each packet it finds. In this exemplary application, some packets may contain audio data in one format while other packets contain video data in another packet format. Some of the video packets may indicate that they are the start of a new video frame, while other video packets may contain addition data for a current video frame. Packet decoder 110 processes the bit stream for each packet it receives from packet decoder 120 in turn. For each packet, if the packet's structure matches the structure of packets described in protocol specification 140, packet decoder 110 outputs typically one or more messages 135 to message processor 130. Each message 135 has a type, and in general, includes a number of parameters that are determined by packet decoder 110 from the input bit stream for the packet being processed. To illustrate the types of messages generated in the exemplary case of multimedia decoding, the messages may functionally include "create new audio stream (stream id)," or "new audio samples for data stream (stream id, data)." Message processor 130 receives these messages, and acts on them using the received information, for example, by displaying video on a monitor and playing the audio on speakers.

Figure 2:
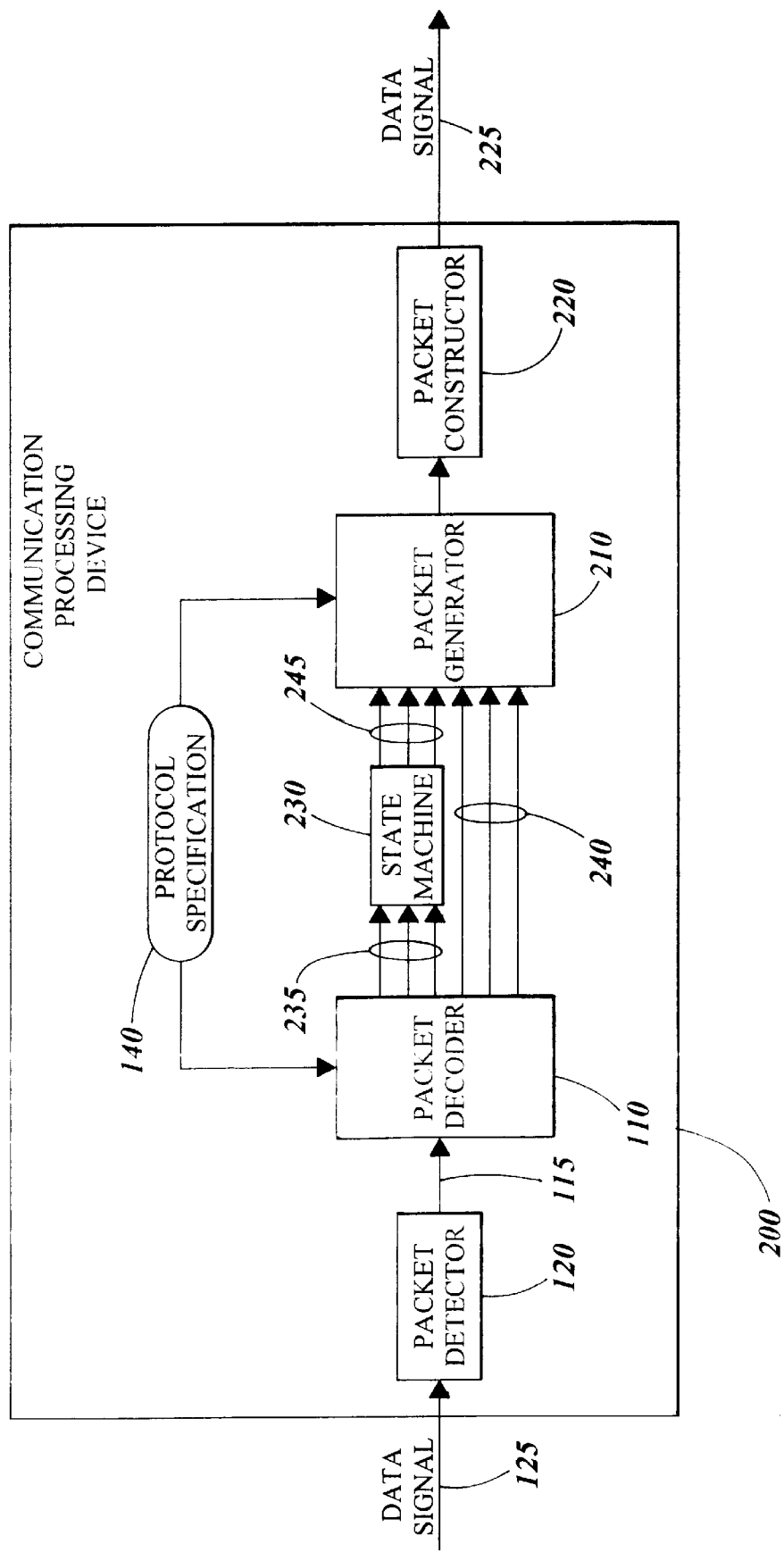
FIG. 2 is a second general view of a communication processing device that makes use of a packet decoder to process a sequence of input packets, a packet generator to create a sequence of output packets, and a state machine coupled between the packet decoder and packet generator.

Referring to FIG. 2, a second general view of a number of other alternative embodiments of the invention is similar to that shown in FIG. 1. In these embodiments, communication processing device 200 includes a packet detector 120 and packet decoder 110 as in communication device 100 (FIG. 1). In addition, communication processing device 200 includes a packet generator 210, which forms packets that have formats defined by protocol specification 140, and a packet constructor 220 that accepts a packet sequence from packet generator 210 and forms a data signal 225 that includes the packets as well as indicators in the data signal of the boundaries between packets. As with data signal 125, which is input to the device, data signal 225, which is output from the device, may alternatively indicate packet boundaries in the output data stream or using characteristics of the signal itself.

Communication processing device 200 also includes a state machine 230. State machine 230 accepts messages 235 from packet decoder 110 and maintains a stored state based on past input packets. After packet decoder 110 completes processing a packet that is provided to it by packet detector 120, and has issued all the messages that are based on that processing, it does not necessarily maintain any history or memory of that packet. State machine 230 on the other hand can maintain such a history. In response to messages 235 that it receives from packet decoder 110, and on its stored state, it issues messages 245 to packet generator 245 and updates its stored state. In addition, packet decoder 110 passes messages 240 directly to packet generator 210. Such direct messages can be used by packet generator 245 to generate an output packet, such as an acknowledgment packet, while packet decoder 110 is still processing an input packet.

The structure shown in FIG. 2 is used in a variety of applications. In one exemplary application, communication processing device 200 accepts a data signal 125 that encodes an information stream according to a first format (or protocol) and produces a new data signal 225 that encodes the same information stream according to a second format (protocol), which is different than the first.

Also, although communication processing device 200 is illustrated with a single input data signal 125 and a single output data signal 225, in various alternative embodiments there are multiple of each. Also, communication processing device 200 may be coupled to another communication device, and accept data signal 125 from that device and provide data signal 225 back in return. In this latter case, for instance, packet generator 210 is responsible for generating acknowledgement packets when data packets are received from the other device.

Figure 3:
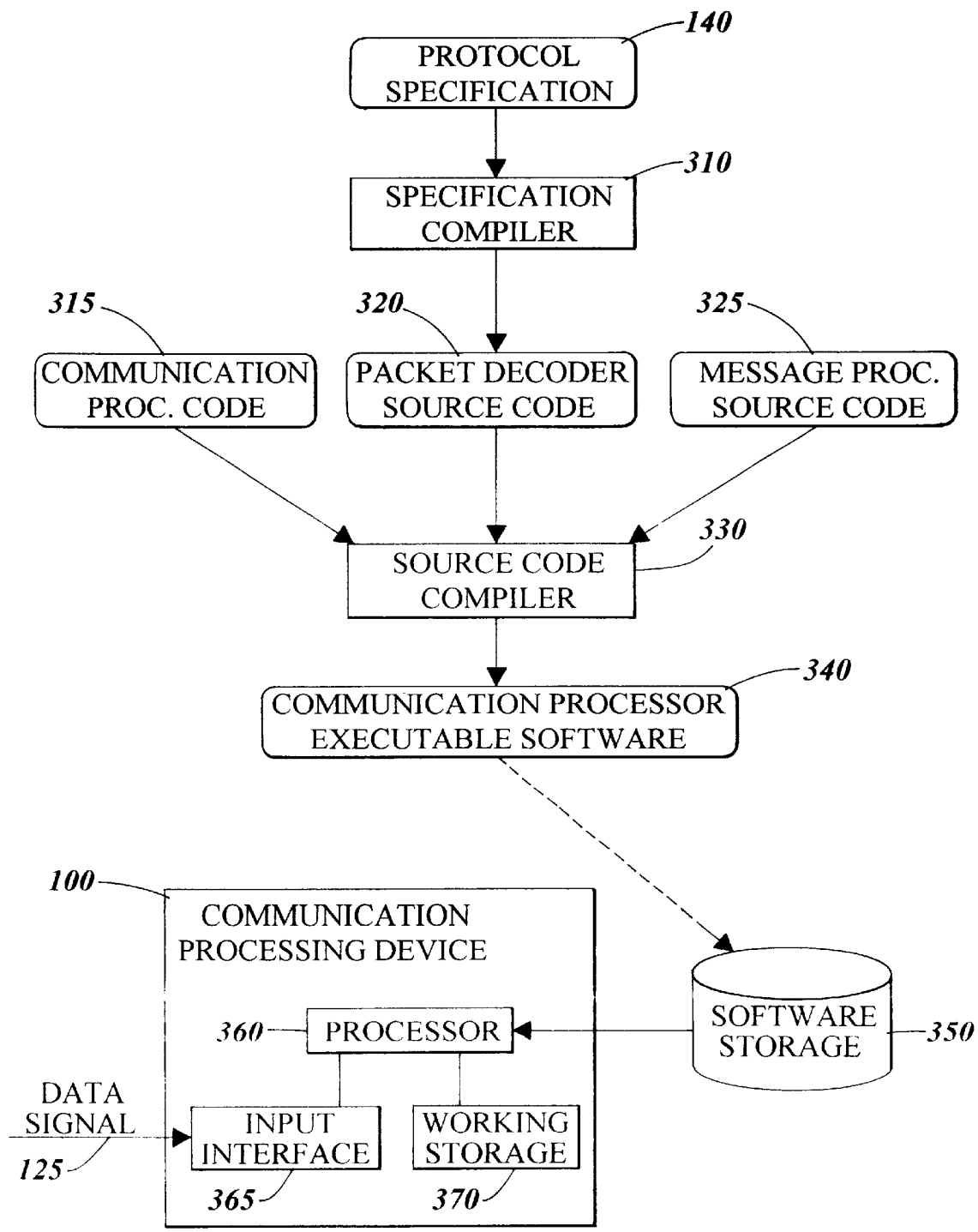
FIG. 3 illustrates a procedure for generating executable software for a software-based communication processing device, and shows a block diagram of a communication processing device.
Figure 4:
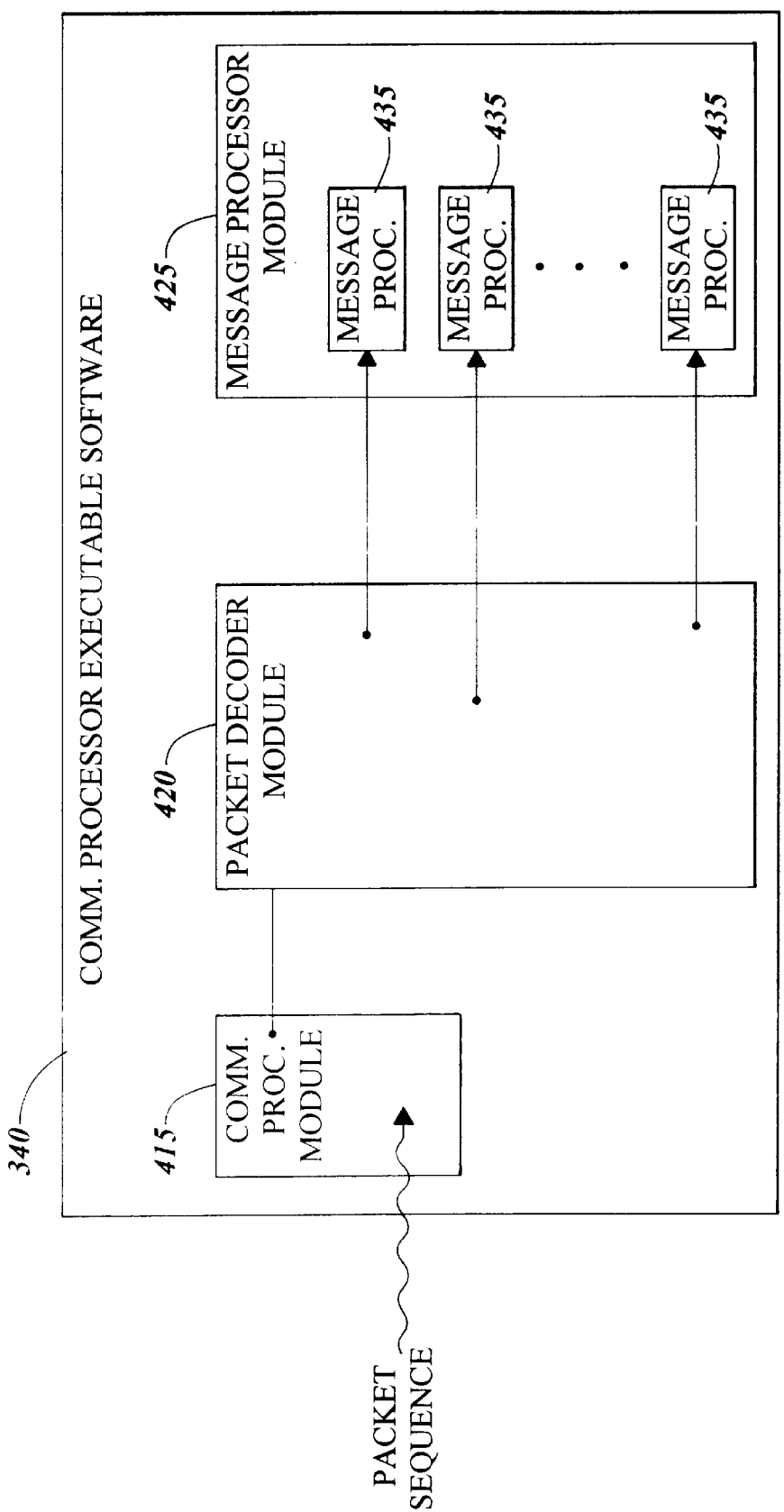
FIG. 4 is a logical block diagram of software modules of the executable software used in a software-based embodiment.

2 Software Embodiment (FIGS. 3–4)

Various embodiments of the invention are software-based, hardware-based, or use a combination of hardware and software. The description that follows is directed at software embodiments in which packet decoder 110, message processor 130, state machine 230, and packet generator 210 are implemented as software modules that execute on a general purpose programmable processor or device controller. Several alternative embodiments, both software- and hardware-based are described in Section 5.

Referring to FIG. 3, a software-based embodiment of the general type shown in FIG. 1 makes use of protocol specification 140 to generate executable software 340. Executable software is executed on a processor 360 in communication processor 100. In this embodiment, communication processor 100 includes processor 360, which is used to execute executable software 340, an input interface 365 for generating packet sequence 115, and working storage 370, which is used by processor 360 while running executable software 340.

Executable software 340 is generated from protocol specification 140 in several steps. First, a specification compiler 310 accepts protocol specification 140 and generates packet decoder source code 320. For instance, specification compiler 310 accepts protocol specification 140 in a syntax described below in Section 3, and produces packet decoder source code in the syntax of the C++ programming language. In addition to protocol specification 140, message processing source code 325, for instance also specified in the syntax of the C++ programming language, defines how individual messages generated by packet decoder 110 will be processed. Finally, communication processor source code 315 includes a specification of overall routines to be executed by the communication processing device, for example, including input routines to accept packet sequence 115 and routines to invoke the routines defined in packet decoder source code 330.

A source code compiler 330, for example a C++ language compiler and associated link editor, accepts communication processor source code 315, packet decoder source code 320, and message processor source code 325, and produces executable software 340. Executable software 340 is transferred to a software storage 350, for instance a magnetic disk or a semiconductor storage in communication processing device 110, for execution by processor 360.

Referring now to FIG. 4, in one software-based embodiment, communication processor executable software 340 includes three modules. These are packet decoder module 420, which corresponds to packet decoder source code 320 (FIG. 3), message processor module 425, which corresponds to message processor source code 325 (FIG. 3), and communication processor module 415, which corresponds to communication processor source code 315 (FIG. 3). A routine in communication processor module 145 inputs packet sequence 115, for example by reading from a hardware register in input interface 365 (FIG. 3). For each packet it inputs, it calls a main routine in packet decoder module 420. Packet decoder module 420 processes the packet, and calls a number of message processors 435, which are implemented as subroutines in message processing module 425. Each of these subroutine calls corresponds to passing a message between packet decoder 110 and message processor 130 in FIG. 1. In operation, message processors 435 are generally associated with occurrence of particular fields in an input packet, and they are called with a parameter that holds the particular value of the field in the input packet.

In the software embodiment described about in relation to FIGS. 3–4, passing messages between packet decoder 110 and message processor 130 (FIG. 1) corresponds to software in packet decoder module 420 (FIG. 4) making subroutine calls to routines in message processor module 425. Alternative software embodiments do not necessarily make use of such a subroutine call communication mechanism. For instance, a message queue can used whereby code in packet decoder module 130 puts messages in the queue and routines in message processor module 425 dequeue the messages. Alternatively, in an event-driven programming approach, different message processors 435 are associated with different message types, and are invoked automatically by a central messaging service when messages of their associated type are sent.

3 Protocol Specification

A particular embodiment of the syntax used for protocol specification 140 is described in this section. Alternative embodiments may use somewhat different syntax to achieve equivalent results. For instance, alternative ways of associating particular messages or message processor routines with occurrence of fields in an input packet may be used.

Referring back to FIGS. 1–2, communication processing devices 100 and 200 make use of a protocol specification 140 for processing packets in input data signal 125 and for creating packets form output data signal 225. In the software embodiment described about with reference to FIGS. 3–4, protocol specification 140 is used to generate executable software 340 (FIG. 3) that is executed of a software-based implementation of communication processing device 100.

Protocol specification 140 includes a specification of allowable packet formats (or structures), including, for example, lengths of data fields and allowable values for those fields. In general, protocol specification 140 includes a hierarchical description of allowable packet formats. A packet format can be described as a succession of sub-packets or data fields, and each sub-packet can be further described as a succession of still other sub-packets and data fields, until the entire packet is accounted for with data fields. Protocol specification 140 includes definitions of the packets and data fields. Data fields include specifications of the number of bits allocated to the field, and optionally an association of numeric values and symbolic names. Packet and sub-packet definitions include specifications of allowable sequences of sub-packets or data fields.

In the description of the syntax of protocol specification 140 that follows, elements in square brackets ("[. . . ]") are options, boldface elements are keywords of the specification language, italicized elements represent parameters or other defined elements, and elements bracketed by parentheses and separated by vertical bars ("( . . . | . . . )") indicate choices of elements.

At the top level of a protocol specification, the syntax of protocol specification 140 includes a packet statement that has the following syntax:

[modifier] packet (argument) [{definition}]

where argument includes a name, and optionally maximum length of the packet with the syntax argument=qualified_name [, length]

and modifier determines the units of length and can be one of bit, octet, auto, zstr (zero terminated string), or str (string). The structure of the packet is contained in the definition portion, which is described below.

In the simplest situation, a packet is defined as a fixed length bit sequence, such as packet sample ("sample name", 80)

which indicates that a packet always has exactly 80 bits, and is named "sample name."

More typically, a packet includes sub-elements. The definition section specifies these sub-elements. For example, a field statement which has the following structure is used:

[modifier] field (argument) [{definition}]

The field statement is similar to the packet statement, except that a field cannot be defined in terms of other packets and fields. That is, it is a terminal element of the grammar that specifies the position of a value encoded in a packet.

To illustrate the use of field statements, a sample packet can be specified as follows:

```
packet sample ("sample one", 80 ) {
    field("first field",32)
    field("second field",32)
    field("third field",16)
}
```

The definition portion of a field statement can be used to associate values, such as numeric constants, with symbolic names that are passed as the parameters of the messages corresponding to that field. The definition portion of the statement is also used to define the action the packet decoder should take when it encounters this field.

As an illustration of use of the definition portion of a field statement to associate values with symbolic names, the definition of the third field in the example above can be replaced with

```
field("third field",16) {
    alt{1: "value one" 2: "value two"
        3: "value three" rest: "another value" }
}
``` so that if a packet is processed in which the last 16 bits of the 80 bit packet have the value 1, the message "third field(value one)" is sent. The rest entry corresponds to a default if none of the enumerated values is chosen.

The definition portion of a packet or field statement can include a repetition of a sequence of one or more fields or nested sub-packets. For example, the definition portion can include the expression

```
repeat{  field("repeated field a",8)
         field("repeated field b",8) }
``` to signify that the fields "repeated field a" and "repeated field b" alternate until the data in the packet is accounted for.

The definition of nested packets can be included within a definition, or can be specified separately, thereby making the specification more readable, and, if the same sub-packet is used in several places, centralizes the definition of that sub-packet.

Field values can be used with the var construct in place of parameters such as field lengths, and can be used in arithmetic expressions in which a value is computed. Such a use is shown in the following example

```
packet sample ("sample two") {
    field("packet byte length",16)
    field("payload",var("packet byte length")*8-16)
}
```

Field values can also be used to determine the format of subsequent portions of a packet. For instance, in the following example, the value of an initial field determines the format of subsequent portions of the packet:

```
packet sample ("sample three") {
    field("payload type", 8)
    alt(var("payload type")) {
        0: packet("subpacket type zero")
        1: packet("subpacket type one")
    }
}
```

Although in many cases, packets can be processed in bit sequence order, that is, the structure of future bits in a packet depends on values, if any, that occur in past bits. When this is not the case, the protocol specification allows a "lookahead" syntax. In particular, la(offset,length) is a value that starts offset bits from the current field and has a length length.

Also, there are situations in which it is not possible or straightforward to predict which of several possible packet formats are consistent with an input bit sequence. However, considering the entire packet as a whole, only some packets are consistent with the values. The any construct signifies that one or more or the definitions may account for the data in the packet, but no messages are sent unless the entire packet is consistent with the structure. In the case that multiple of the formats are consistent with the data, the first listed is chosen. An example of use of the any construct is as follows:

```
packet sample ("sample four") {
    alt {
        packet("packet type zero")
        packet("packet type one")
    }
}
```

The definition portions of field statements are also used to specify the actions that the packet decoder is to take when it encounters a field. An arithmetic assignment statement or subroutine call can be specified using variables corresponding to field values. C++ operators are enclosed in <: and :> brackets, and field variables are referenced using the varo construct described above. For example, the statement var("fielda")<:=:>var("fieldb") <:+:>var("fieldc")

sets the value of the fielda field to be the sum of the values of the fieldb and fieldc fields.

A second example of an action specification is a call to a subroutine, for example, specified as <:ActionSubr(:>var("fielda")<:):> for a call of the subroutine named ActionSubr with its argument being the value of the fielda field.

In the above description, field names are indicated as strings. The specification syntax uses a nested packet and field names to fully specify a field. For example, the field "a field" in a packet named "the packet" is fully specified as "the packet":"a field". A field name that is prefixed with a colon signifies that it is already a fully qualified name, that is, it is not prefixed by the higher level packet names.

The packet specifications are object-oriented in that the scope of field names is local to the packet (or sub-packet) being defined. This allows the same packet definition to be used repeatedly in a protocol without having conflicting field names.

4 Exemplary Protocol Specification (FIGS. 5–9F)

In order to illustrate the form of a protocol specification, a portion of the specification of packets in a ITU-T Q.2931 (B-ISDN Application Protocol) communication protocol is described. In particular, the protocol includes a class of packets called "information elements." Within this class of packets, one particular packet type is a "Broad-band Bearer Capability" packet. In the description below, the specification of the class of information element packets is described, as well as a specification of the particular broad-band bearer class packet.

Figure 5:
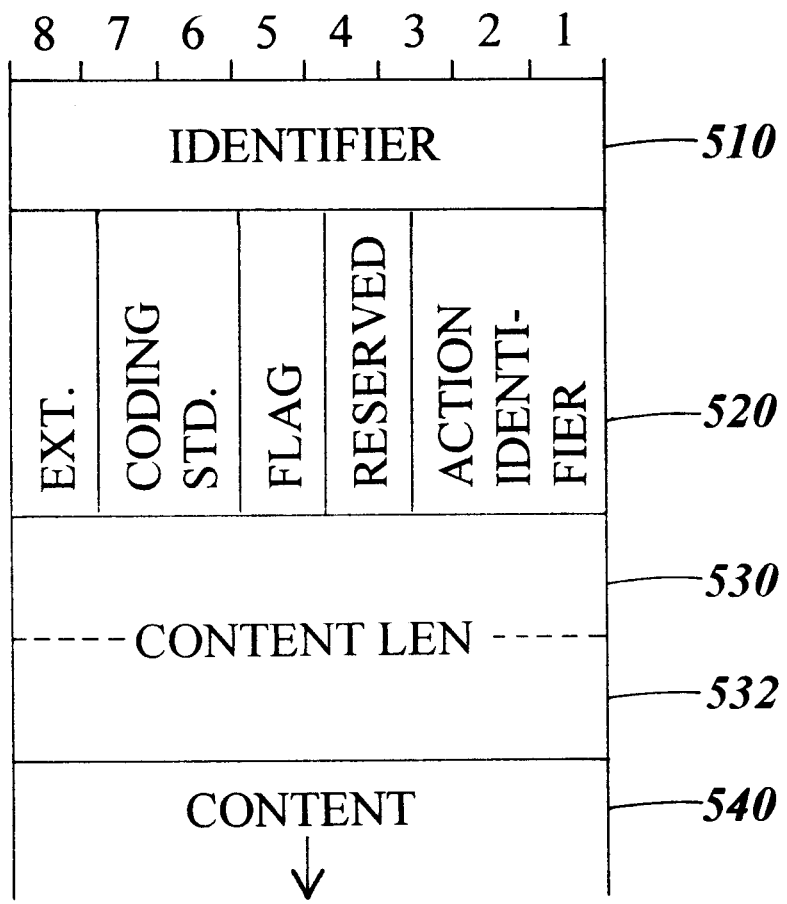
FIG. 5 illustrates an exemplary packet structure.

Referring to FIG. 5, the general format of an information element packet 500 includes a series of 8-bit units (bytes) each illustrated as one row in the figure. The first byte is an "identifier" 510 that specifies the type of the information element. The next byte 520 includes additional fields. The next 16 bits, bytes 530 and 532, is "contens len," which is the entire length of packet 500. This is followed by the contents 540 itself, which in general includes multiple bytes. The format of contents 540 depends on the value of "identifier" 510 in the first byte of packet 500.

Referring to FIGS. 6A–6B, a specification of this packet is shown as it appears in protocol specification 140 (FIGS. 1–2), including associations of particular values of fields with symbolic names appropriate to the protocol. Lines 100 (FIG. 6A) through 177 (FIG. 6B) define the format of information element packet 500 (FIG. 5). Lines 101 through 131 define the first 8-bit field, identifier 510 (FIG. 5). In addition to naming the field and specifying the length of the field to be 8 bits at line 101, lines 102 through 130 associate particular values of the file with symbolic constants. When the packet decoder processes the first byte of an input packet according to this specification, it sends an "identifier" message with the parameter being the symbolic names associated with the actual value. Lines 132 through 142 similarly define the fields in the second byte 520 of information element packet 500. Line 143 both defines the next 16-bit field, "contens len," and also specifies using the len construct that the entire information element packet has a bit length specified by this field.

Turning to FIG. 6B, the remainder of the protocol specification uses an alt construct to specify that the remainder of the packet is a sub-packet, and that the particular sub-packet type depends on the value of "identifier" which was located at the first byte of the packet. Note that at line 153, the specification indicates that if identifier is equal to 0x5e ($01011110_2$) then the remainder of the packet is a "broad-band bearer capability" packet.

Figure 7:
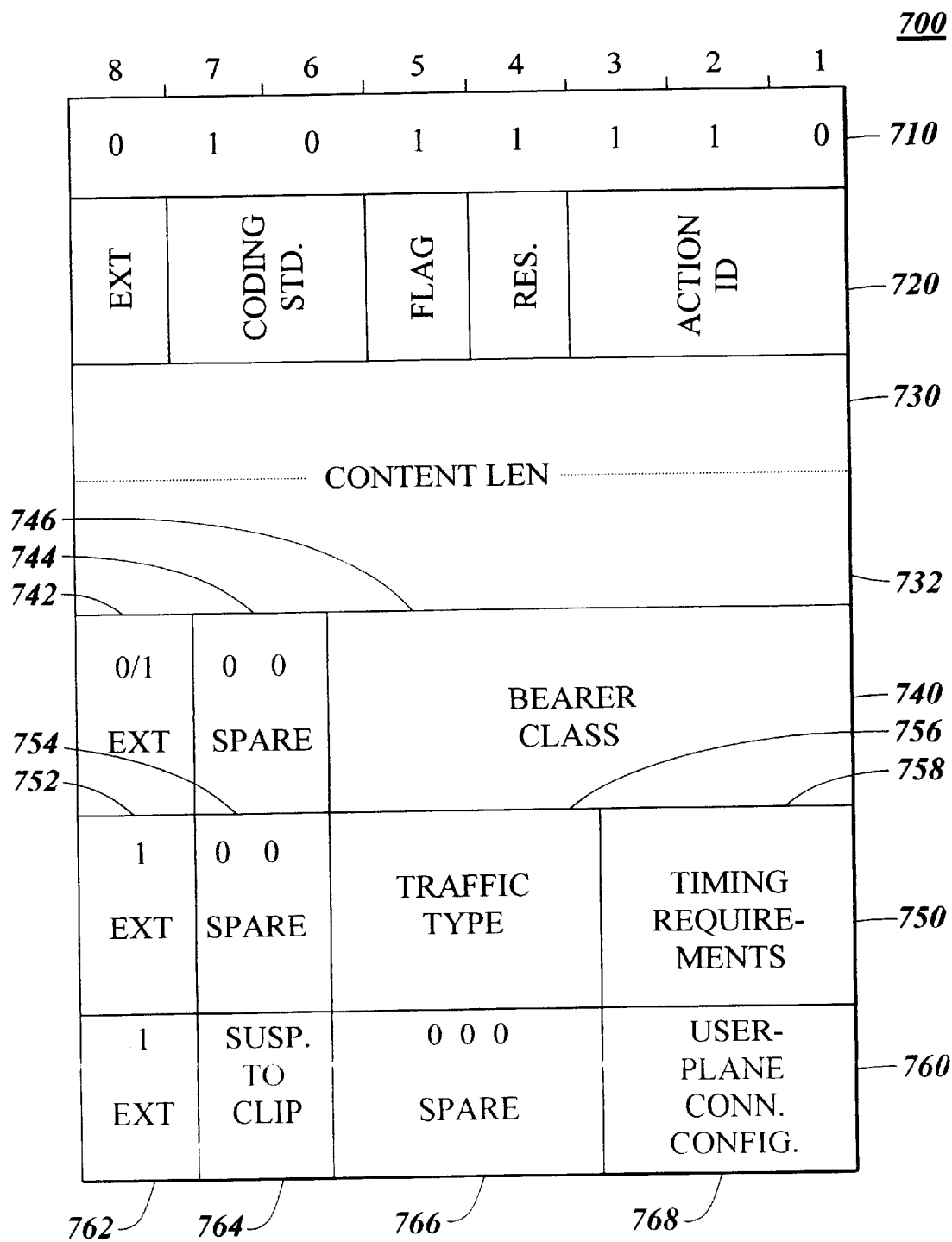
FIG. 7 illustrates a particular type of information element packet.

Turning to FIG. 7, a broad-band bearer capability information element 700 includes a first byte 710 in which identifier equals 0x5e, and bytes 720, 730, and 732 of the same form as in the generic information element packet 500 (FIG. 5). Bytes 740, 750, and 750 are formatted according to the "broad-band bearer capability" protocol specification.

Turning to FIG. 8, the broad-band bearer capability packet (a sub-packet of an information element packet) is specified using similar specification constructs as shown in FIG. 5. Lines 101 through 104 specify a byte 740 (FIG. 7), the first byte of the contents which is specific to a broad-band bearer capability packet. Lines 105 through 117 define the format of a next byte 750 (FIG. 7) which is present only if the "ext bit" field 742 (FIG. 7, specified at line 101) of the first byte 740 is equal to 0. Lines 118 through 127 define the format of the last byte 760, which is always present.

Referring back to FIG. 3, protocol specification 140 is processed by specification compiler 310 to produce packet decoder source code 320, which is later combined with message processing source code 325 to form executable software 340. Referring to FIGS. 9A–G, portions of the source code is illustrated. Referring to FIGS. 9A–C, the protocol specification shown in FIGS. 6A–B for the "information element" packet type is compiled into the C++ language to form the subroutine C$Q_2931_Signaling::PP$information_element( )

which is a method of the C$Q_2931_Signaling object class. This subroutine begins at line 100 in FIG. 9A. Referring to lines 104–105, the value of the "identifier" field is first obtained using the Processfield( ) call, and then the value of the field is stored in the global variable V$FP$identifier. In line 105, the message processing function FP$identifier( ) is called with the parameter value for the identifier field in the packet. This procedure of obtaining field values and the calling the appropriate message processing function is repeated in lines 160–117, corresponding to lines 132 through 143 in the specification in FIG. 6A. At line 118 in FIG. 9A, the len construct used in the protocol specification is translated to the SetPduLen( ) call which resets the length of the packet being processed. The remainder of the PP$information_elements subroutine corresponds to the alt construct at lines 144 through 177 in the protocol specification in FIG. 6B. In particular, lines 144 and 145 correspond to line 157 in FIG. 6B, which corresponds to the special case of a broad-band bearer capability information element. At line 145 in FIG. 9B, PP$information_elements calls PP$broad_band_bearer_capability( ) to further process the packet if the value of identifier is 0x5e.

In this example, no actions are explicitly specified in the definition portions of the field specifications. As an option, specification compiler 310 generates implicit actions for each field, corresponding to a call to a subroutine that prints out the content of the field. Using this option, specification compiler 310 essentially produces a protocol analyzer (or "sniffer") that can be used to monitor communication sent according to the specified protocol.

Turning now to FIGS. 9D–E, an example of a message processing routine, in this case for the identifier message, is shown. This routine is called from line 105 in FIG. 9A to process the identifier field. In the example in FIGS. 9D–E, the routine PrintName( ) is called to output the symbolic name associated with the value of identifier. Other message processing routines would act on the value in other ways.

Turning to FIG. 9F, the PP$broad_band_bearer_capability( ) routine at lines 215 through 256 corresponds to the "broad-band bearer capability" protocol specification at lines 100 through 128 in FIG. 8. As in the PP$information_element( ) routine, field values are each obtained in turn by a call to ProcessField( ) and then stored in a global variable, for example in lines 219 and 220 for the "ext bit" field.

5 Alternative Embodiments

Other software-based embodiments, which use the same protocol specification syntax, use different approaches to communicating the field values in an input packet to the message processor (see FIG. 1), or to a state machine and a packet generator (see FIG. 2). For instance, rather than passing field values a parameters in messages or subroutine calls, the values can be passed through a shared field storage in which field names are associated with field values.

In other embodiments, rather than generating source code from a protocol specification, which is in turn compiled into executable software, the protocol specification is preprocessed to produce a binary form and which is then interpreted by software in the communication processing device at run time. In one example of preprocessing, the protocol specification, which is input as readable text, is processed into a data structure that more efficiently encodes the same information.

In other embodiments, rather than using a general-purpose processor or controller to process the input packets based on the protocol specification, a customized processor is used. The customizations include instructions that are specially tailored for processing the input packets. These tailored instructions are called directly in source code obtained by processing the protocol specification, or are called by an interpreter that processes the protocol specification, or an equivalent data structure, at run time.

In other embodiments, customized hardware is designed from the protocol specification. For instance, rather than processing the protocol specification to produce a source code in a procedural programming language, the protocol specification is translated into a hardware description language (e.g., Verilog) that is then processed by hardware design software to specify customized integrated circuits.

Still other embodiments use a combination of generation of program source code, data structures describing the protocol specifications, and hardware specification from the protocol specification.

Other embodiments make use of parallel processing to implement the packet decoder. For example, packet decoder module 420 (FIG. 4) can be implemented on a multiple-processor computer. When a sub-packets of known length is encountered by the packet decoder, the processing of that sub-packet is performed on another processor in parallel while processing of the packet continues with the portion following that sub-packet. In order to ensure proper interpretation of incoming packets, the protocol specification can optionally include statements that indicate that particular sub-packets can be safely processed in parallel.

Figure 10:
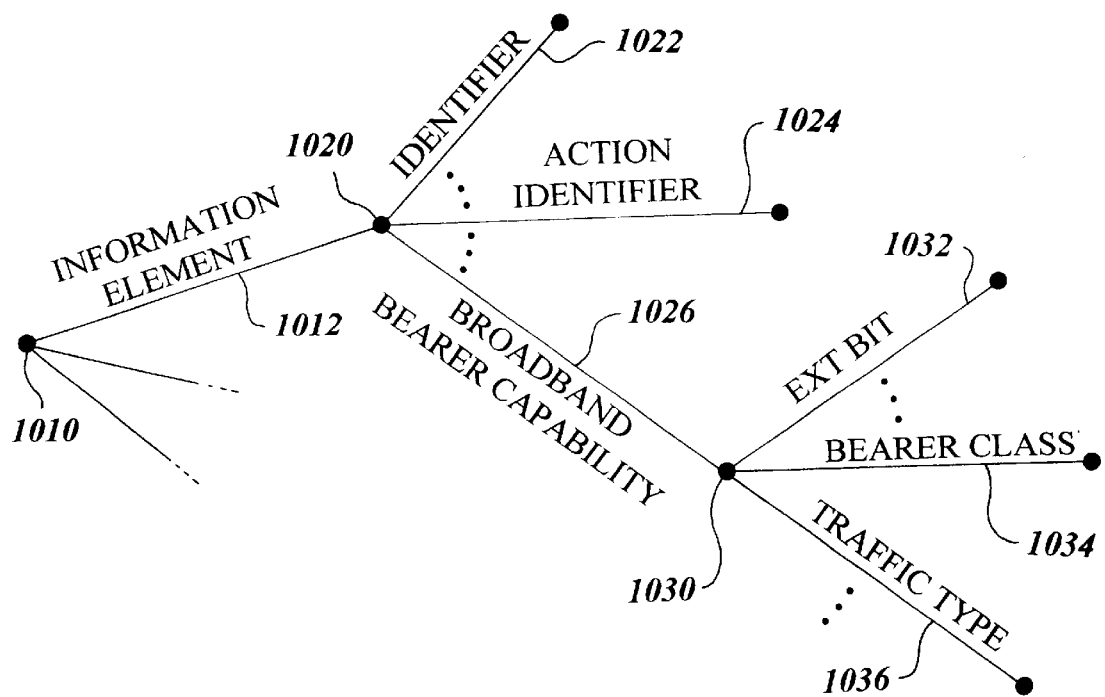
FIG. 10 is a tree-structured representation of a protocol.

Another view of the process of creating a hardware or software implementation according to a protocol specification is to arrange the nested sub-packets and fields in a tree structure, a direct solution tree, with actions associated with leaves and possibly internal nodes of the tree. Referring to FIG. 10, a portion of such a tree structure are shown for the example specification in FIGS. 6A–B and FIG. 8. A root node 1010 corresponds to any type of input packet. A branch 1012 corresponds to a information element packet, defined at line 100 in FIG. 6A. Branch 1012 terminates at a node 120, from which branches originate corresponding to the various sub-packets and fields of an information element packet. For example, a branch 1022 corresponds to an identifier field (line 101, FIG. 6A), a branch 1022 corresponds to the action identifier field (line 142, FIG. 6A), and a branch 1026 corresponds to the broadband bearer capability sub-packet (line 158, FIG. 6B). Branch 126 terminates at a node 130 which is the root of branches corresponding to the sub-elements of a broadband bearer capability sub-packet. For example, branch 1032 corresponds to the ext bit field (line 101, FIG. 8), branch 1034 corresponds to the bearer class field (line 103, FIG. 8), and branch 1036 corresponds to the traffic type field (line 107, FIG. 8). Note that only a small number of paths through such a tree are taken for any one packet, and the same path may be taken multiple times, for example, if the same sub-element of a packet is repeated multiple times.

In various embodiments, packet detector 120 (see FIG. 1) uses hardware approaches, software approaches, or a combination of hardware and software approaches to determine the boundaries of individual packets. In addition, packet detector 120 can alternatively also perform a packet assembly function in which it detects multiple packets, but it assembles the individual packets to form a larger packet before forwarding that larger packet to packet decoder 110. An example of such packet assembly may be found in an ATM-based system in which packets each split into a series of ATM cell payloads, and then the packet detector reassembles the larger packets before further decoding. In the case of electrical characteristics of data signal 125 signifying packet boundaries, packet detector 120 includes electronic circuitry for identifying the packets, and for converting the content of the packet into a finite-length digital bitstream of the information in the packet. In the case that packet boundaries are identified in the bit stream itself, packet decoder 110 takes a continuous digital bit stream transmitted in data signal 125 and sends finite length subsequences of bits to packet decoder 110. Packet decoder 110 receives the bit stream, and processes the content of the bit stream.

In the description in Section Error! Reference source not found. above, a particular syntax for the protocol specification is described. In other embodiments, other specification can be used. For example, other types of phrase-structured grammars can be used to describe the nested structure of packets, sub-packets, and fields in a packet. As in the above embodiment, the packet decoder parses the input packet based on the grammar to determine the nested boundaries of packets (phrases, non-terminal elements) and fields (terminal elements), and then issues messages based on the resulting parse of the input packet.

Related embodiments of the invention are applicable in areas other than data communication in which processing of information sequences with complex structures is required. One such embodiment is in the area of chemical analysis in which an automated chemical analyzer creates a sequential description from a sample of a chemical using well known chemical analysis techniques. This sequential description is then fed to a "decoder" that accepts a chemical specification that has a similar form to the protocol specification described in other embodiments. In particular, the chemical specification includes definitions of typically nested constituents that may be found in the sequential description, as well as associated actions to take when those constituents are found. In another embodiment, a similar approach can be taken to analyze complex DNA sequences using a DNA specification that is analogous to the protocol specification used in the communication-related embodiments.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for processing a data signal comprising:
   accepting a protocol specification that includes a plurality of specifications of elements, each of said specifications including a length for encoding the element in the data signal and a name for the element, wherein the specifications of at least some of the elements are in terms of sequences of other of the plurality of elements, and the specification of at least some of the elements includes one or more instructions for performing an action associated with said elements and necessitated by the protocol specification;
   accepting a series of data packets formed from the data signal;
   for each accepted data packet, associating portions of said data packet with elements specified in the protocol specification; and for each of the associated portions of the input packet, performing any actions according to the instructions included in the specification of elements associated with that portion of the input packet.

2. The method of claim 1 wherein the instructions for performing the actions include programming language statements, and wherein performing said action according to the instructions includes executing the programming language statements.

3. The method of claim 2 further comprising processing the protocol specification to produce executable software that implements the associating of portions of input packets with elements specified in the protocol specification and the performing of actions associated with elements specified in the protocol specification.

4. The method of claim 2 wherein the protocol specification includes an object-oriented specification of elements, wherein names of components of an element are local to that element.

5. The method of claim 2 wherein the protocol specification includes for at least some of the elements an association of a numerical value identifying said element with a symbolic name for said element.

6. The method of claim 1 further comprising processing the protocol specification to produce a hardware description, and wherein performing actions included in the specification of elements includes sending a message identifying a specified action.

7. The method of claim 1 wherein accepting the protocol specification includes accepting a specification for a telecommunication protocol.

8. The method of claim 7 wherein accepting the specification for the telecommunication protocol includes accepting sufficient information for unambiguously processing the data signal by associating different portions of the data signal with different elements specified in the protocol specification.

9. The method of claim 8 wherein accepting the specification for the telecommunication protocol further includes specification of error-handling actions.

10. The method of claim 1 wherein associating portions of said data packet with elements specified in the protocol specification includes associating at least some elements with portions of the data packet that are not aligned within said packet to a multiple of the length of said element.

11. The method of claim 1 wherein performing at least one of the actions of an element associate with said portion of the input packet includes sending a notification message that includes the name of said element and a value obtained from said portion of the input packet.

12. The method of claim 1 wherein performing at least one of the actions of an element associate with said portion of the input packet includes sending an acknowledgment packet in response to a data packet formed from the data signal.

13. The method of claim 1 wherein performing at least one of the actions of an element associate with said portion of the input packet includes transforming a format of data received in the data signal.

* * * * *